(12) United States Patent
Meehan et al.

(10) Patent No.: US 7,734,557 B2
(45) Date of Patent: Jun. 8, 2010

(54) METHODS, SOFTWARE, AND SYSTEMS FOR KNOWLEDGE BASE COORDINATION

(75) Inventors: Stephen W. Meehan, British Columbia (CA); Noah Zimmerman, Palo Alto, CA (US); Leonore Herzenberg, Stanford, CA (US)

(73) Assignee: The Board of Trustees of Leland Stanford Junior University, Palo Alto, CA (US)

( * ) Notice: Subject to any disclaimer, the term of this patent is extended or adjusted under 35 U.S.C. 154(b) by 386 days.

(21) Appl. No.: 11/398,851

(22) Filed: Apr. 5, 2006

(65) Prior Publication Data
US 2007/0299799 A1 Dec. 27, 2007

Related U.S. Application Data

(60) Provisional application No. 60/668,867, filed on Apr. 5, 2005.

(51) Int. Cl.
*G06F 17/00* (2006.01)
*G06N 5/02* (2006.01)
(52) U.S. Cl. .............................. 706/46; 703/2; 709/224
(58) Field of Classification Search .................. 706/46, 706/47; 707/1
See application file for complete search history.

(56) References Cited

U.S. PATENT DOCUMENTS

2006/0075013 A1 * 4/2006 Hite et al. .................... 709/201

* cited by examiner

*Primary Examiner*—Donald Sparks
*Assistant Examiner*—Kalpana Bharadwaj
(74) *Attorney, Agent, or Firm*—Greenberg Traurig, LLP

(57) ABSTRACT

The present invention provides computer program products, systems, and related methods of coordinating a knowledge base.

19 Claims, 8 Drawing Sheets

FACS "LAB WIDE" TYPE OF ONTOLOGY

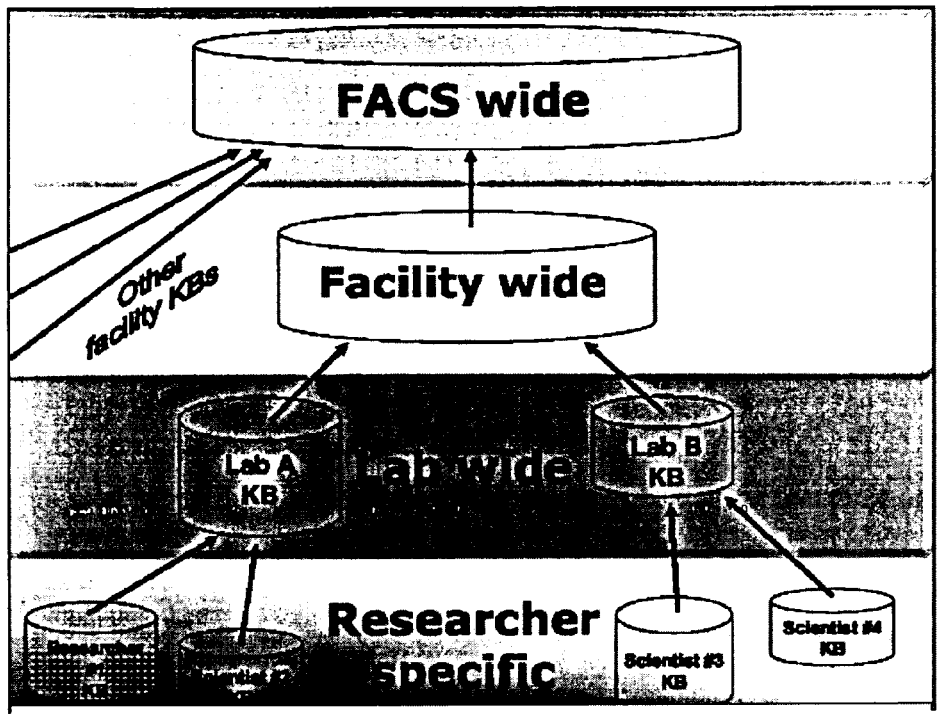

FIG. 1 FACS "LAB WIDE" TYPE OF ONTOLOGY

Opened knowledge bases:
3. org/www.ScienceXperts.com/FACS/facility.pprj
4. domains/FACS/facsWide.pprj
5. domains/skg.pprj
6. org/www.ScienceXperts.com/FACS/skgOrg.pprj
7. org/www.ScienceXperts.com/FACS/demoMouse.skg.pprj

Performing step #27 of 27

Building reagent inventory maps

FIG. 2

Knowledge base document(s) opened at http://facs.stanford.edu:8080/sciencexperts/

| Knowledge base document | Location | Ver. | Ver. time |
|---|---|---|---|
| users/sjleblanc@quinelaw.com/FACS/protocols.pprj | server | 0 | Mar 24, 2006 00:44 PST |
| domains/FACS/facsWide.pprj | server | 65 | Mar 07, 2006 21:32 PST |
| org/www.ScienceXperts.com/FACS/facility.pprj | server | 13 | Mar 01, 2006 11:34 PST |
| org/www.ScienceXperts.com/FACS/demoMouse.pprj | server | 6 | Feb 24, 2006 12:40 PST |

| Security knowledge base document | Location | Ver. | Ver. time |
|---|---|---|---|
| domains/skg.pprj | server | 10 | Mar 10, 2006 18:14 PST |
| org/www.ScienceXperts.com/FACS/skgOrg.pprj | server | 0 | Feb 28, 2006 14:34 PST |
| org/www.ScienceXperts.com/FACS/demoMouse.skg.pprj | server | 1 | Mar 23, 2006 19:59 PST |

[ ✓ Close ]

FIG. 3

| Fluorochrome: Rho110 | | |
|---|---|---|
| Key<br>Rho110 | ☐ Is Tandem | Tracking |

| Field | Value |
|---|---|
| Knowledge level/scope | FACS wide: domains/FACS/facsWide.pprj |
| Created by | stephen@MeehanMetaSpace.com |
| Date created | Sep. 26, 2004 14:49:11.842 PDT |
| Modified by | Stephen Meehan |
| Date modified | Feb. 06, 2006 14:20:50.687 PST |
| Active | true |
| Version | 128 |
| Instance is read-only (because it is included) | |
| Internal ID | facsWide_29867 |

Additional optical response(s)

| Optical filters | Laser configurations |
|---|---|

Recognition(s)

| Specificity |
|---|

*FIG. 6*

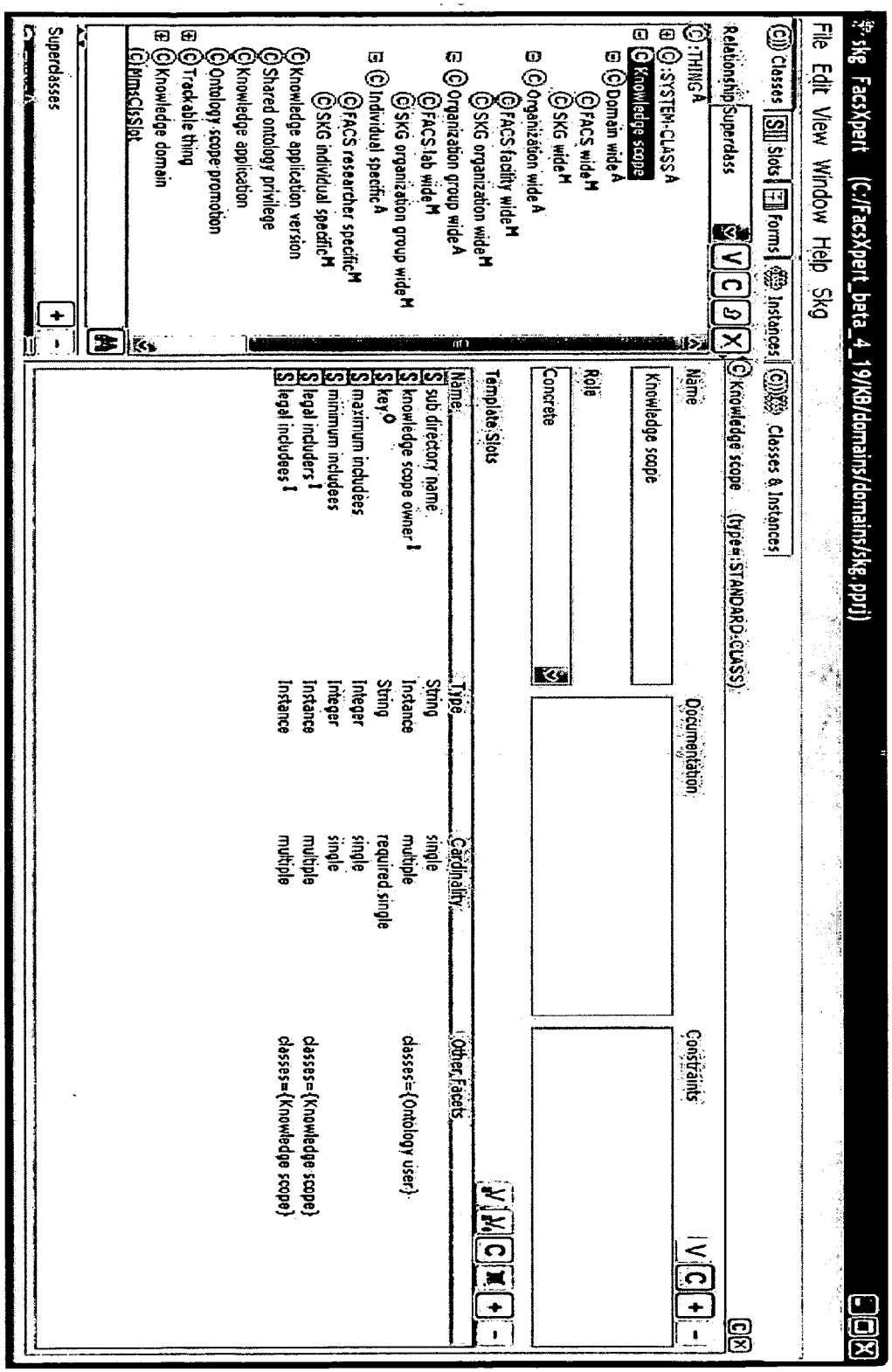
FIG. 7– ONTOLOGY TYPE HIERARCHY

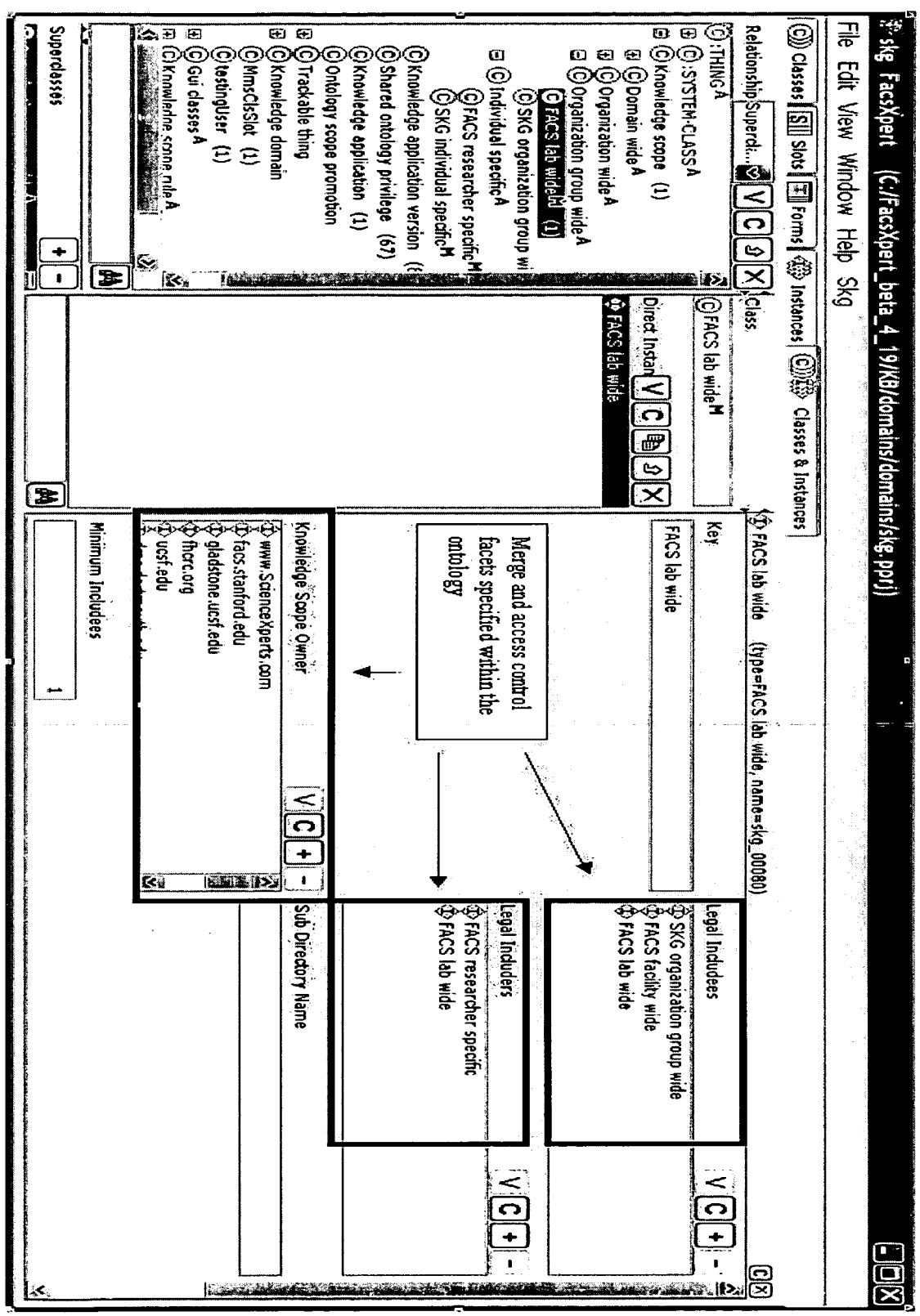
*FIG. 8 – INSTANCE OF "FACS LAB WIDE" TYPE OF ONTOLOGY*

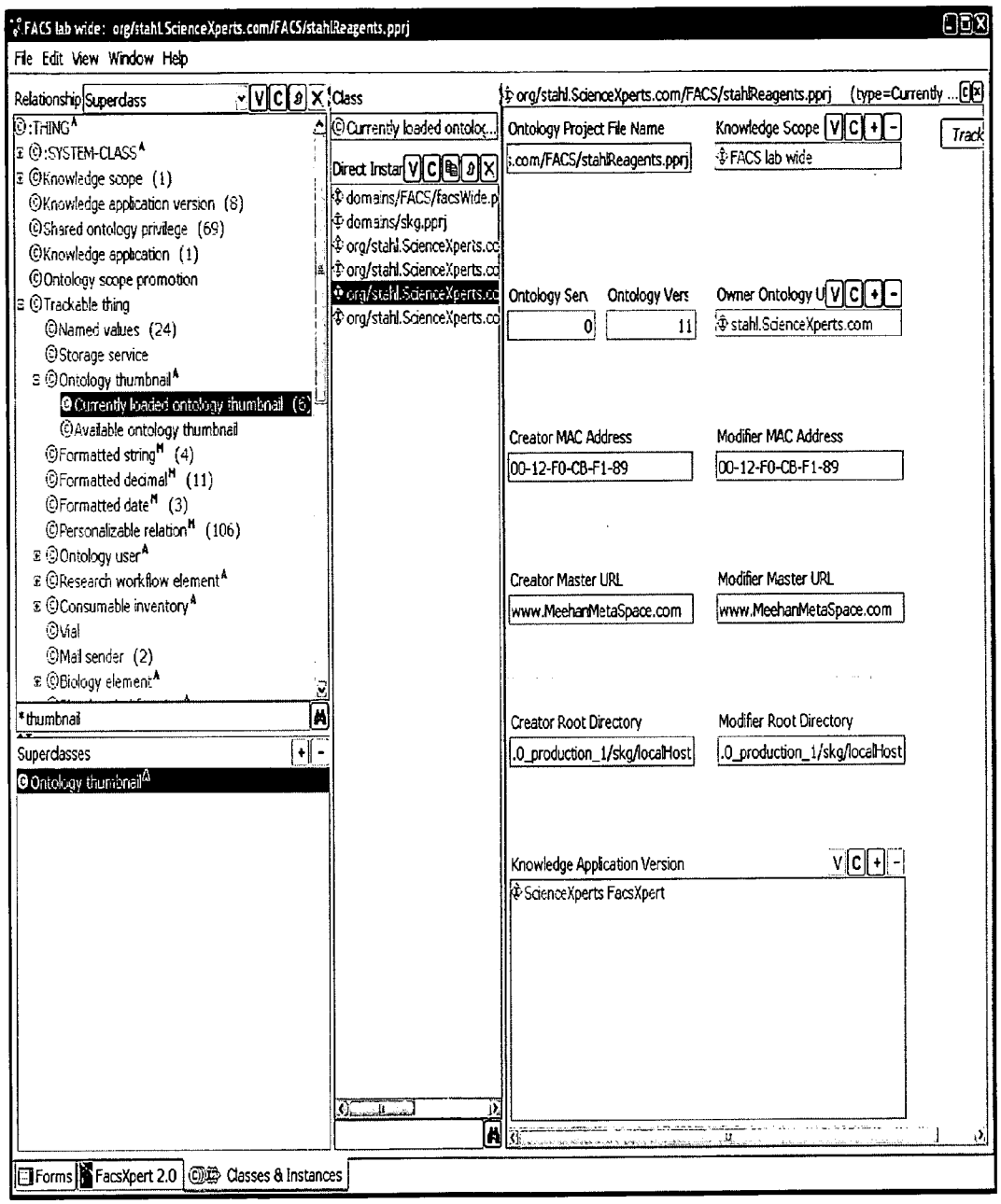
FIG. 9 STALHREAGENTS TYPE REGISTRATION

| 101a | Click here to indicate data file |

| 102a | Click here to display and modify user-settable options |

| 103 | License and Intellectual Property Rights Statement Summary (click here to view full statement) |

| 104 | Login Name: _____ <br> Password: _____ |

| 105a | Delivery Option 1 (Click Here To Select) |

| 105b | Delivery Option N (Click Here To Select) |

*FIG. 10*

| 120 | Your request has been accepted and is being processed |
| 122 | Your results will be ready in approximately \_\_ minutes. |
| 124 | This request will be charged to account: AccountId (click here to change account information) |
| 126 | The expected charge for this analysis is \_\_\_. |
| 128 | Results from this analysis will be transmitted to _____ (click here to change results destination) |

*FIG. 11*

METHODS, SOFTWARE, AND SYSTEMS FOR KNOWLEDGE BASE COORDINATION

CROSS REFERENCE TO RELATED APPLICATIONS

This application claims priority from provisional patent application 60/668,867 filed 5 Apr. 2005 and incorporated herein by reference.

APPENDIX

This application is being filed with a computer source code listing appendix that has been deposited electronically. This appendix provides additional description of certain aspects of the invention and is incorporated by reference. The appendix contains multiple files providing computer source code and object code listings of logic routines and structures according to specific embodiments of the invention.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

BACKGROUND OF THE INVENTION

Knowledge-based tools are utilized in a wide variety of contexts including the semantic web, engineering design and optimization, anthropology, linguistics, medical imaging, biology and certain flow cytometry applications.

SUMMARY OF THE INVENTION

1. Introduction/Summary

The creation of formally represented reusable knowledge-sources is one of the major accomplishments of the knowledge-representation community in recent years. Ontologies like the Gene Ontology (GO), Suggested Upper Merged Ontology (SUMO) and the Foundational Model of Anatomy (FMA) are curated resources publicly available for developers to "plug-in" to their domain specific knowledge-based application. This growing repository of resources supports the ultimate vision of ontologies as reusable knowledge components and services that can be invoked across networks.

While resources to create an overall library of such ontologies are emerging, the infrastructure for integrating these disparate sources is still inadequate. Tools such as PROMPT [1] have emerged to address the problem of mapping, merging and extracting semantically independent components of these ontologies; however, the tools do not safeguard the semantics, security, integrity and accessibility of a multi-ontology system.

A knowledge-base coordinator (KBC) according to specific embodiments of the invention addresses these issues by providing seamless inclusion of multiple ontologies based on modeled knowledge in a secure, traceable and location transparent design.

According to specific embodiments of the invention, a KBC improves upon the ontology inclusion mechanism in tools such as Protégé by providing extensions to support multi-ontology hierarchical systems. In specific embodiments, these extensions include the use of a further ontology (sometimes referred to as a meta-ontology) with a set of class definitions and instances related to ontologies to classify other ontologies into types as well as many other class definitions and other structures to allow and control the access of users to a merged ontology based on up to many different source ontologies. Thus, in specific embodiments, a KBC provides an integrated model that supports multiple ontology types, rules for ontology inclusion, access control security and ontology versioning.

In specific embodiments, a Protégé plug-in architecture can be used to interpret a meta-ontology of the invention at runtime and to monitor and authorize opening, creating, modifying, including and saving one or more other (source) ontologies. A KBC according to specific embodiments of the invention can also provide a client-server architecture for coordinating the versioning and offline caching of multiple ontologies.

In specific embodiments, a KBC according to the invention emerged out of a need for knowledge-base management in the FacsXpert project. FacsXpert is a Protégé based tool for supporting Fluorescence Activated Cell Sorting (FACS) protocol development. FIG. 1 is a block diagram illustrating an example four-tiered knowledge structure to provide a user with context sensitive decision support when designing a FACS experiment, where each level of knowledge maps to a distinct ontology.

While many techniques are used to perform various tasks in file or database systems, ontologies have generally been viewed as and involved complex knowledge representation only. Within the field, ontology proponents generally do not use ontologies within a running knowledge application for the dynamic evolvability of behavior and for persistence of state as is done in the current invention.

Thus, while some of the individual functions according to specific embodiments of the invention may have analogies in other data management idioms (i.e. computer system files or database systems, e.g., Access or SQL), according to the invention, methods and techniques have been developed in the context of ontologies that have not previously been available or thought applicable to ontologies. The invention thereby provides methods and techniques that are ontology-specific (and in some examples Protégé™-specific) that allow one ontology to merge independently designed ontologies optionally at runtime into a new ontology. In many situations, this new ontology has gestalt-like characteristics where the whole is greater than the sum of the parts. According to specific embodiments of the invention, the individual ontologies may have identical or very different schemas, but for various reasons it becomes desirable to merge them even if this merge was nor foreseen by the ontology designers. Other data management idioms (even distributed databases) generally do not allow such runtime gestalt, where independently designed schemas can be merged at runtime.

Traditional uses for ontologies are: (1) authoring controlled vocabularies and other such design/analysis artifacts; (2) facilitating communication among multiple agents (human and/or computer) through common definitions; and (3) reasoning, inference and classification of external application data.

According to specific embodiments of the invention, Protégé or another ontology development tool or environment is used to store the majority of a software application's (e.g., FacXpert™, written in JAVA) fundamentals (e.g., behavior, visualization and state) in a meta ontology that is dynamically evolvable at runtime.

In specific embodiments, a KBC according to the invention includes an embedded interpreter that looks at the meta-ontology and produces the implied fundamentals but still allows programming overrides.

In one aspect, the invention relates to computer program product comprising a computer readable medium that comprises one or more logic instructions that: determine whether to include one or more ontology types in another ontology; control user access to individual ontologies; hide information relating to: data source locations for ontologies, how to connect to data source locations for ontologies, and/or how to make data source locations for ontologies available to authorized users when offline; determine source ontologies for instances in a knowledge base; and/or, control ontology versions so as to prevent concurrent modification and to keep offline caches of authorized users in sync with updated versions.

In another aspect, the invention provides a system, comprising at least one logic device that comprises one or more logic instructions that: determine whether to include one or more ontology types in another ontology; control user access to individual ontologies; hide information relating to: data source locations for ontologies, how to connect to data source locations for ontologies, and/or how to make data source locations for ontologies available to authorized users when offline; determine source ontologies for instances in a knowledge base; and/or, control ontology versions so as to prevent concurrent modification and to keep offline caches of authorized users in sync with updated versions.

In other aspects, the invention relates to various methods of coordinating a knowledge base.

In some embodiments, analysis according to the invention can be accessed using an information processing system and/or over a communications network. According to specific embodiments of the invention, a client system is provided with a set of interfaces that allow a user to indicate one or more analyses and/or analysis parameters and that may direct a user to input the necessary initial data or option selections. The client system displays information that identifies analysis available and displays an indication of an action that a user is to perform to request an analysis. In response to a user input, the client system sends to a server system the necessary information. The server system uses the request data, and optionally one or more sets of server data, to perform the requested analysis. Subsequently, results data are transmitted to the client system. In specific embodiments, such analysis can be provided over the Internet, optionally using Internet media protocols and formats, such as HTTP, RTTP, XML, HTML, dHTML, VRML, as well as image, audio, or video formats, etc. However, using the teachings provided herein, it will be understood by those of skill in the art that the methods and apparatus of the present invention could be advantageously used in other related situations where users access content over a communication channel, such as modem access systems, institution network systems, wireless systems, etc. Thus, the present invention is involved with a number of unique methods and/or systems that can be used together or independently to provide analysis related to biologic or other data. In specific embodiments, the present invention can be understood as involving new business methods related to providing such analysis.

The invention and various specific aspects and embodiments will be better understood with reference to the following drawings, appendices, and detailed descriptions. In some of the drawings and detailed descriptions below, the present invention is described in terms of the important independent embodiment of a system operating on a digital data network. This should not be taken to limit the invention, which, using the teachings provided herein, can be applied to other situations, such as cable television networks, wireless networks, etc. For purposes of clarity, this discussion refers to devices, methods, and concepts in terms of specific examples, e.g., flow cytometry. However, the invention and aspects thereof have applications to a variety of types of devices and systems. It is therefore intended that the invention not be limited except as provided in the attached claims.

It is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems and/or methods that include many different innovative components and innovative combinations of innovative components and known components. No inference should be taken to limit the invention to combinations containing all of the innovative components listed in any illustrative embodiment in this specification. The functional aspects of the invention that are implemented on a computer, as will be understood from the teachings herein, may be implemented or accomplished using any appropriate implementation environment or programming language, such as C, C++, Cobol, Pascal, Perl, Fortran, Java, Java-script, PLI, LISP, HTML, XML, dHTML, assembly or machine code programming, etc. All references, publications, patents, and patent applications cited herein are hereby incorporated by reference in their entirety for all purposes. All documents, data, and other written or otherwise available material described or referred to herein, are incorporated by reference.

BRIEF DESCRIPTION OF THE DRAWINGS

FIG. 1 is a block diagram illustrating an example four-tiered knowledge structure to provide a user with context sensitive decision support when designing a FACS experiment, where each level of knowledge maps to a distinct ontology.

FIG. 2 provides an example of a graphical user interface startup splash screen showing that the specific knowledge base context for a particular user merges several knowledge bases when opening according to specific embodiments of the invention.

FIG. 3 provides an example of a graphical user interface showing direction inclusion links according to specific embodiments of the invention.

FIG. 6 provides an example of a graphical user interface showing an instance for Rho 10 according to specific embodiments of the invention.

FIG. 7 provides an example of a meta ontology (referred to in some example embodiments as SKG for shareable knowledge base gestalt) and the class hierarchy defined for the purpose of classifying other ontologies according to specific embodiments of the invention.

FIG. 8 illustrates a specific instance of an ontology with type FACS lab wide according to specific embodiments of the invention.

FIG. 9 illustrates an ontology stahlreagents.pprj indicating that it is a Facs lab wide ontology according to specific embodiments of the invention.

FIG. 10 illustrates an example interface for obtaining data analysis using a computer interface, possibly over a web page, according to specific embodiments of the present invention.

FIG. 11 is a block diagram showing a representative example logic device in which various aspects of the present invention may be embodied.

DETAILED DISCUSSION OF THE INVENTION

Figures 4, 5:
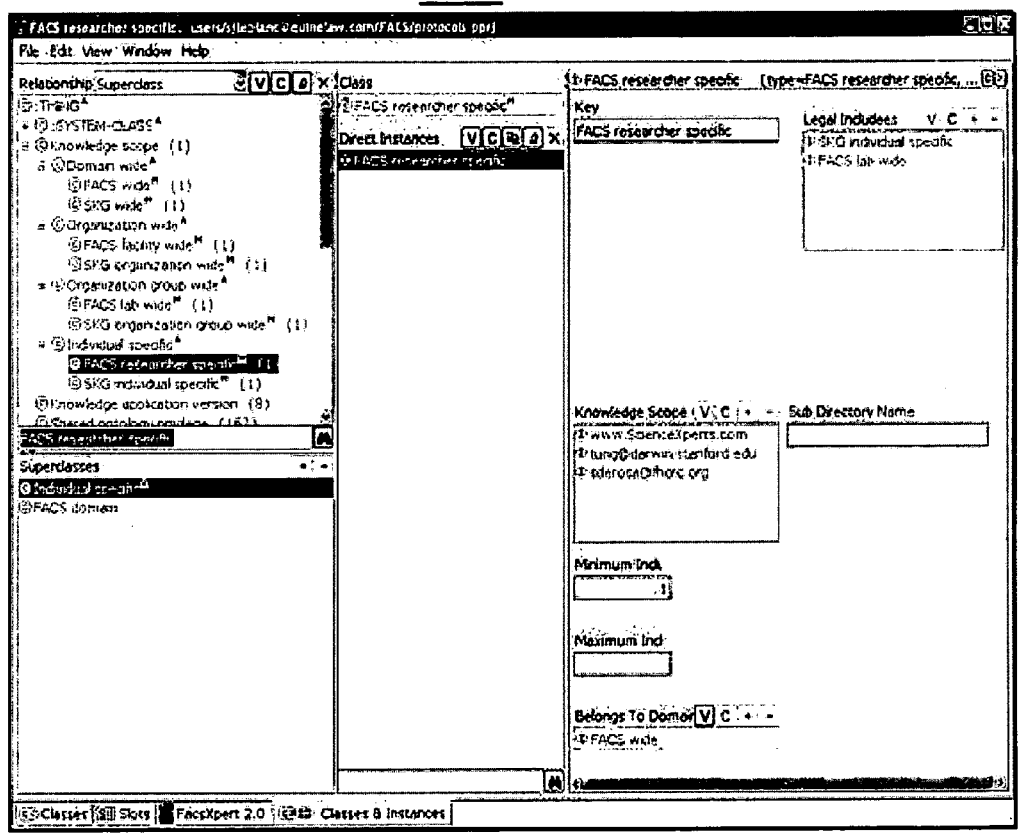
FIG. 4 provides an example of a graphical user interface showing a Help/About FacsXpert dialog would according to specific embodiments of the invention.
FIG. 5 provides an example of a graphical user interface showing the results of entering researcher specific in the class lookup field and selecting this class in the class tree at the north-west part at the window and selecting the instance in the Direct instances list at the north-mid part of the window according to specific embodiments of the invention.

Before describing the present invention in detail, it is to be understood that this invention is not limited to particular methods, devices, or systems, which can, of course, vary. It is also to be understood that the terminology used herein is for the purpose of describing particular embodiments only, and is not intended to be limiting. In addition, unless defined otherwise, all technical and scientific terms used herein have the same meaning as commonly understood by one of ordinary skill in the art to which the invention pertains. Furthermore, it is to be understood that although the methods, systems, and other aspects of the invention are described herein, for purposes of clarity of illustration, with particular reference to flow cytometry, such reference is not intended to be limiting.

3. Glossary

The following definitions are provided as a guidance in understand various aspects of the present invention. These definitions are intended to be expository only and are intended not to be limiting. The invention as claimed should be understood in light of this entire specification and the understanding of words and phrases as used in relevant arts.

Ontology—In computer science, an ontology is most often generally understood as an exhaustive and rigorous conceptual schema about a domain and is often expressed in various computer programming languages or data formats as a hierarchical data structure containing all the relevant entities and their relationships and rules within that domain. In some cases, ontology is also used to describe a schema as well as instance values in the schema. (This combination of schema and instance values in this art is also referred to as a Knowledge Base.) This latter definition of ontology, including instance values, is generally used herein, except where the context allows or requires otherwise.

Concepts: objects and sets of objects (also known as classes or categories)

Characteristics: the attributes of objects (also known as slots, roles, or properties)

Relations: models of how concepts and characteristics are related to one another (also known as functions)

Knowledge Base—An instance of an ontology schema; also an ontology schema and a set of instance values within the schema defined by the ontology.

Knowledge Base Coordinator (KBC)—according to the present invention an ontology about ontologies and other application extensions that allow and manage the use of merged ontology made up of multiple source ontologies Merging (or Including) one ontology in another—according to specific embodiments of the invention, creating generally at runtime a merged ontology that is a combination of multiple source ontologies. The merged ontology can be used by the user as though it were a single ontology. One or more of the source ontologies can also be a merged ontology.

Ontology type—according to specific embodiments of the invention, an ontology type is defined by the KBC meta-ontology. In specific embodiments, source ontologies may include data in them indicating their type. In other embodiments, the type of a source ontology may be implied or known by the KBC. In further embodiments, the KBC can include one or more rules that allow the KBC to assign a type to a newly encountered ontology.

4. Introduction Ontologies and Ontology Tools

Ontologies

The present invention, in specific embodiments, involves systems for data and/or rules and/or data relationship representation storage and management and accessing that have come to be referred to in the relevant art as ontologies. Ontologies can be represented in a computer readable logic language (such as a general purpose programming language (C++, PERL, Java, etc. ), or a general purpose markup language (XML, RDF, etc.), or a more special purpose knowledge-base or ontology language (OWL, KIF, Cyc).

Generally, ontologies are used to represent complex data relationships or knowledge models that are then accessed by one or more applications. In the present invention, however, a further ontology (or meta-ontology) is used to represent knowledge about other ontologies and to provide the primary mechanism for providing an application's persistence of state and control of behavior in a runtime flexible way. According to specific embodiments of the invention, this use of a meta-ontology allows sophisticated merging and access control of multiple source ontologies.

One methodology for creating ontologies is based on declarative knowledge representation systems. Developing and maintaining ontologies, including meta-ontologies, can be done in a number of ontology environments including Protégé, Ontolingua, and Chimaera. Many available environments can be categorized as either frame-based systems or description logic (DL) systems.

An ontology together with a set of individual instances of classes constitutes a knowledge base. A particular knowledge base can also be understood as an instance of an ontology. However, to simplify terminology, in the present discussion, ontology and knowledge base are generally equivalent unless the context requires otherwise and merging ontologies as used herein should generally be understood as mean the same as merging knowledge bases.

In fields of expert systems, complex database management, etc., an ontology is also understood as a formal explicit description of concepts in a domain. In some situations, an ontology can be understood as comprising classes (sometimes called concepts) which are representations of objects in a domain, properties (sometimes called slots, attributes or roles) that describe various features and attributes of the classes, and relations that model the interactions between classes and properties. Facets (sometimes called role restrictions) can optionally be associated with an ontology to constrain classes, properties or relations.

Classes are the focus of most ontologies. Classes describe concepts in a domain of knowledge. For example, a class of comic books represents all comic books. Specific comic books are instances of this class. A class can have subclasses that represent concepts that are more specific than the superclass. For example, a subclass of Spiderman comic books.

Slots describe properties of classes and instances. In describing comic books, for example there may be three slots: the slot length with a value indicating the page length, the slot year, with a value indicating year of publication, and the slot seller with a value indicating sellers of the comic book. At the class level, instances of the class Comic Book will have slots with these three properties.

All instances of the class Comic Book, and its subclass Spiderman, have a slot seller the value of which is an instance of the class Sellers. Likewise, all instances of the class Seller have a slot inventory that refers to all the Comic Book instances that are available from that seller.

Typically, all subclasses of a class inherit the slot(s) of that class. A slot generally is attached at the most general class that can have that property. For example, slot cardinality defines how many values a slot can have. Some systems distinguish only between single cardinality (allowing at most one value) and multiple cardinality (allowing any number of values). A value-type facet describes what types of values can fill in the slot.

Developing an ontology can includes (1) defining classes; (2) arranging classes in a taxonomic (subclass-superclass) hierarchy; (3) defining slots and describing allowed values for these slots, (4) filling in the values for slots for instances. A knowledge base is created by defining individual instances of these classes filling in specific slot value information and additional optionally providing slot restrictions.

In many situations, reusing existing ontologies for either new applications or different domains has many benefits including by not limited to the reduction of development time and the use of peer-reviewed/validated knowledge sources. Many ontologies are already available in electronic form and can be imported into an ontology-development environment.

An "is-a" Relation

The class hierarchy in most situations typically represents an "is-a" relation: a class A is a subclass of B if every instance of B is also an instance of A. Generally, A subclass relationship is transitive. Maintaining a consistent class hierarchy may become challenging as domains evolve. One challenge occurs when all members of a particular class previously shared a single slot value, but come to have two different values for that slot. This requires breaking or splitting a class into two or more classes and also possibly changing other aspects of the class hierarchy.

Siblings in a class hierarchy are classes that are direct subclasses of the same class. In general, all the siblings in the hierarchy (except for the ones at the root) must be at the same level of generality.

Multiple Inheritance

Most knowledge-representation systems allow multiple inheritance in the class hierarchy: a class can be a subclass of several classes.

One issue that arise in designing an ontology is whether to model a specific distinction as a property value or as a set of classes. Likewise, deciding whether a particular concept is a class in an ontology or an individual instance depends on what the potential applications of the ontology are. Deciding where classes end and individual instances begin starts with deciding what is the lowest level of granularity in the representation. The level of granularity is in turn determined by a potential application of the ontology. Individual instances are typically considered to be the most specific concepts represented in a knowledge base.

Disjoint Subclasses

Many systems allow explicitly specifying that several classes are disjoint. Classes are disjoint if they cannot have any instances in common. In some systems, if it is declared that class A and class B are disjoint and later a class C that is a subclass of A and B is created, a system can indicate that there is a modeling error.

Inverse Slots

A value of a slot may depend in a predictable on a value of another slot or slots. Storing the information "in both directions" is redundant. In an application using the knowledge base can always infer the value for the inverse relation, the system can either derive that information when it is asked for or can automatically fill in the value of one slot when another is filled.

Ontology Development Tools

In many situations, Ontologies or Knowledge Bases are developed, maintained and edited using a set of software applications or tools specifically for that purpose. These tools can be textual and/or graphic and can be very specific to one purpose or can be more general tools that assist in many aspects of KB management and/or development.

Protégé

An important example of such a tool is the Protégé™ ontology editor and knowledge-base framework. Protégé is a free, open source ontology editor and knowledge-base framework. One example Protégé platform supports two main ways of modeling ontologies via the Protégé-Frames and Protégé-OWL editors. Protégé ontologies can be exported into a variety of formats including RDF(S), OWL, and XML Schema.

Protégé is based on Java, is extensible, and provides a plug-and-play environment that makes it a flexible base for rapid prototyping and application development.

A Protégé-Frames editor is available that further provides a full-fledged user interface and knowledge server to support users in constructing and storing frame-based domain ontologies, customizing data entry forms, and entering instance data. Protégé-Frames implements a knowledge model which is compatible with the Open Knowledge Base Connectivity protocol (OKBC). In this model, an ontology consists of a set of classes organized in a subsumption hierarchy to represent a domain's salient concepts, a set of slots associated to classes to describe their properties and relationships, and a set of instances of those classes—individual exemplars of the concepts that hold specific values for their properties.

Features of Protégé-Frames include: (1) A wide set of user interface elements that can be customized to enable users to model knowledge and enter data in domain-friendly forms. (2) A plug-in architecture that can be extended with custom-designed elements, such as graphical components (e.g., graphs and tables), media (e.g., sound, images, and video), various storage formats (e.g., RDF, XML, HTML, and database back-ends), and additional support tools (e.g., for ontology management, ontology visualization, inference and reasoning, etc.). (3) A Java-based Application Programming Interface (API) that makes it possible for plug-ins and other applications to access, use, and display ontologies created with Protégé-Frames.

OWL

Another tool or set of tools related to ontologies is the Web Ontology Language (OWL). This language is equipped with a formal semantics described in the OWL Web Ontology Semantics and Abstract Syntax [OWL S&AS]. Using these semantics, inferences about ontologies and individuals can be made. Within ontologies, often there are a number of inferences that can be made, both about the classes defined in the ontologies (for example discovering that class definitions are inconsistent), and about the instances of the ontology (for example discovering that a particular instance is inferred to be a member of a particular class). An ontology editor/reasoner can be used to examine inferences that can be drawn from the given assertions.

5. Knowledge Base Coordinator

FIG. 7 provides an example of a meta ontology (referred to in some example embodiments as SKG for shareable knowledge base gestalt) and the class hierarchy defined for the purpose of classifying other ontologies according to specific embodiments of the invention.

This class hierarchy starts with the selected class Knowledge scope. Instantiations of subclasses of this class describe a specific type of ontology: the entities that can "own" the ontology; which types of ontologies can include this ontology and which types of ontologies can be included by this ontology.

FIG. 8 illustrates a specific instance of an ontology with type FACS lab wide according to specific embodiments of the invention. The KBC inspects the highlighted fields (slots) to determine how several independent ontologies without prior knowledge of one another can be merged in a meaningful way typically at runtime. The instance in FIG. 8 is only allowed to include ontologies with knowledge scope "FACS facility wide", "FACS lab wide", and "SKG organization group wide". The instance can only be included by ontologies with knowledge scope "FACS researcher specific" and "FACS lab wide." One simple consequence of this structure is that this FACS lab wide instance is not allowed to include an ontology of type "FACS researcher specific". The authors of this FACS lab wide ontology have determined that it would not be appropriate for this type of merge to occur because it may cause undesirable dependencies.

These ontology types (knowledge scope) do not specify the knowledge contained in the ontology, but rather information describing the knowledge contained therein. This meta-knowledge is necessary in order to merge several independent ontologies in a way which preserves their meaning and purpose.

In specific embodiments, ontologies indicate that they are an instance of one of these pre-defined ontologies by including the skg ontology. They are then registered by instantiating a SKG class "Currently loaded ontology thumbnail" which contains a brief summary of the ontology and filling in the attribute value "Knowledge scope." For example, FIG. 9 illustrates an ontology stahlreagents.pprj indicating that it is a Facs lab wide ontology according to specific embodiments of the invention.

In one example, an ontology named domains/skg.pprj is the "root" meta-ontology meaning "ontology about ontologies". The "about ontologies" include this ontology to be processable by KBC. These ontologies can have a purpose to represent other knowledge domains or to provide further selective information about the "meta-ontology" domain. For example SKG organization group wide is an SKG type of ontology that describes "meta-ontology" information for an ontology at the organization group level like a FACS lab wide ontology. SKG type ontologies and contain information about specific users, organizations and ontology types (Knowledge scopes). KBC assures that a type of ontology is allowed to be "owned" by a specific user or organization. Ownership includes create, read and write permissions. Owners can share these permissions with other users.

In this one example, the FACS wide level represents concrete knowledge shared by all FACS researchers. This includes knowledge of fluorescent elements, their fluorescence excitation and emission, lasers, and FACS instruments. The facility level provides knowledge about the facility, such as specific instrument configurations. The lab wide level represents shared laboratory information such as inventories and shared protocols. Finally, the researcher specific level contains knowledge about the individual's protocols.

In this example embodiment, each level includes its parent ontology. In this example, the term inclusion (as opposed to merging) is used. In this case, parent is a synonym for the ontology which is being included and this type of inclusion results in a containment hierarchy. So, given ontology A and B, with and ontology B including ontology A the result is that ontology B is a superset of A and A is a subset of B. Thus in specific embodiments a merging of ontologies is accomplished by including additional ontologies into an original ontology and not by necessarily creating of a third ontology, though as described herein, the run-time creation of the ontology is presented to the user is presented with a single coherent view of a multi-ontology system. According to specific embodiments of the invention, these inclusions are managed and made possible by a KBC. In specific embodiments, a KBC can be implemented as a Protégé ontology along with further logic instructions to use that ontology in presenting the multiple ontologies in a merged view.

In specific embodiments, the KBC acts to prevent invalid inclusions such as a lab wide ontology including a researcher specific ontology. The KBC also provides a model to restrict users' read/write privileges at varying levels of the hierarchy. For instance, a lab administrator has permission to modify her own researcher specific knowledge-base as well as the lab wide knowledge-base, but not the facility knowledge-base or FACS wide knowledge-base.

In each case in specific embodiments, however, the user need not be aware of the knowledge-hierarchy—the instances of classes, slots, etc., of the multiple included ontologies are simply presented to them as editable if they have the requisite privileges. One can inspect the underlying structure and details. In specific implementations, the KBC extends Protégé's inclusion mechanism to trace the ontology inclusion path for each instance.

Versioning and Online/Offline Distribution of Ontologies (or Knowledgebases)

In specific embodiments, the client-server architecture of the KBC manages the versioning and offline caching of ontologies. Versioning is imposed on the ontologies to track changes by multiple users.

The invention includes a system for assembling multiple ontologies from different locations either online or offline. In online mode, the client checks the KBC server for modifications to both the requested ontology and all of the ontologies included by the requested ontology. For example, a request for a FACS lab wide ontology may include as many as seven or more additional ontologies such as the FACS facility ontology for which this lab is a member. These ontologies can reside a) on the client box b) on the KBC server c) another location referred to by a URL. If more recent versions of ontologies relevant to the requester are available, they are downloaded from the respective location (stored as a value in the associated meta-ontology) and cached on the local host. Currently implemented using Sun's Java Web Start (JWS) technology.

If the client is not able to access the server (offline), the KBC loads the latest version that is available on the local machine. All ontology locations are stored as relative paths in the meta-ontologies such that the KBC can reconstruct the absolute path to the resource both online and offline.

JNLP Tables 1-3 are examples of output generated by the KBC by inspecting the meta-ontologies. These are Sun's Java Network Launching Protocol (JNLP) XML files which instruct the client where the ontologies and associated resources are located. Each corresponds to a different knowledge scope and can be signed by different digital signatures for security.

TABLE 1

```
<jnlp spec="1.0+" codebase="#$%^#$$#%^#^">
<information>
    <title>FacsXpert, ver. 2.0</title>
    <vendor>ScienceXperts Inc.</vendor>
    <homepage href="index.html"/>
    <description>Advises on flow cytometry protocols - User
Specific level</description>
</information>
<security>
<all-permissions/>
</security>
<resources>
    <jar href="../resources.jar"
part="users/sjleblanc@quinelaw.com/resources.jar" />
    <jar href="protocols.resources.jar"
part="users/sjleblanc@quinelaw.com/FACS/protocols.resources.jar"
/>
    <jar href="protocols.jar"
part="users/sjleblanc@quinelaw.com/FACS/protocols.jar" />
</resources>
<component-desc/>
</jnlp>
```

TABLE 2

```
<?xml version="1.0" encoding="utf-8"?>
<jnlp spec="1.0+" codebase="$%^&$%^&$%^&"
href="org_www.ScienceXperts.com_778337108.jnlp">
<information>
    <title>FacsXpert, ver. 2.0</title>
    <vendor>ScienceXperts Inc.</vendor>
    <homepage href="index.html" />
    <description>Advises on flow cytometry protocols - Org
level</description>
</information>
<security>
<all-permissions/>
</security>
<resources>
    <jar href="../../../org/www.ScienceXperts.com/FACS/facility.jar"
part="org/www.ScienceXperts.com/FACS/facility.jar" />
    <jar href="../../../org/www.ScienceXperts.com/FACS/facility.resources.jar" part="org/www.ScienceXperts.com/FACS/facility.resources.jar" />
    <jar href="../../../org/www.ScienceXperts.com/FACS/demoMouse.jar"
part="org/www.ScienceXperts.com/FACS/demoMouse.jar" />
    <jar href="../../../org/www.ScienceXperts.com/FACS/demoMouse.resources.jar" part="org/www.ScienceXperts.com/FACS/demoMouse.resources.jar"
/>
    <jar href="../../../org/www.ScienceXperts.com/FACS/demoMouse.skg.jar"
part="org/www.ScienceXperts.com/FACS/demoMouse.skg.jar" />
    <jar href="../../../org/www.ScienceXperts.com/FACS/skgOrg.jar"
part="org/www.ScienceXperts.com/FACS/skgOrg.jar" />
```

TABLE 2-continued

```
</resources>
<component-desc/>
</jnlp>
```

TABLE 3

```
<?xml version="1.0" encoding="utf-8"?>
<jnlp spec="1.0+" codebase="$%^&$%^&#!"
href="kbDomain778337108.jnlp">
<information>
    <title>FacsXpert, ver. 2.0</title>
    <vendor>ScienceXperts Inc.</vendor>
    <homepage href="index.html" />
    <description>Advises on flow cytometry protocols - Domain
level</description>
</information>
<security>
<all-permissions/>
</security>
<resources>
    <jar href="../../../domains/FACS/facsWide.resources.jar"
part="domains/FACS/facsWide.resources.jar" />
    <jar href="../../../domains/FACS/facsWide.jar"
part="domains/FACS/facsWide.jar" />
    <jar href="../../../domains/skg.jar" part="domains/skg.jar"
/>
</resources>
<component-desc/>
</jnlp>
```

Runtime Behavior

In further embodiments, the KBC promotes run time extensibility for the end-user because a knowledge application (e.g., FacsXpert) derives the majority of its behavior from runtime interpretation of its KBC ontology. Thereby, in specific embodiments allowing a user to extend a KBC while its related application is running.

Knowledge Management and Merged Ontology Dispute Resolution

In further embodiments, a merging ontology is able to override the merged ontology's attribute-value assertions in a traceable way. This ability means that all or part of an instance state in a merged ontology can be overridden in the merging ontology so that whenever that instances attribute-values are interrogated, the un-overriden or overridden value is provided without the interrogator needing to know the difference.

In further embodiment, if the interrogator needs to know the difference, however, an additional special interrogation service is available in the KBC enhanced version of the core to divulge this.

This mechanism of the invention provides distinctive support for common scenarios in knowledge management:

(1) disputing knowledge—here the override would be marked and traced as a challenge to the instance; resolvable disputes are supported with a resolution services that corrects the merged instance (promoting knowledge up the inclusion hierarchy).

(2) extending knowledge—here the override would be marked and traced as an extension to the instance similar to the concept of class extending or sub-classing (3) supplementary extension—here we have an instance from the includer which the includee wishes to supplement with additional information. The schema of the knowledge is not affected. Today, the inverse slot value is not set for multi-level composite objects, so that when the supplemental values are added, there is no updating of the backpointer to the including class. For example, say that we have an instance PE of a class fluorochrome defined in knowledge base FW and an instance CD of a class antibody defined in knowledge base LW. Furthermore, say we have a fluorochrome slot conjugation defined in FW that relates one fluorochrome to one or more antibodies. If the knowledge base LW includes the knowledge base FW one could create a conjugation Z between PE and CD in the merged knowledge base. Since FW is the includee, (and is independent of LW), the instance PE will not save this fluorochrome-antibody-conjugation. Indeed, as an independent knowledge base we do not want to modify FW directly, as it may be used in different places by multiple applications. In this case the including knowledge base (LW) has supplemented the included (FW) instance with additional information (namely a new antibody-fluorochrome conjugation). In specific embodiments, this supplementary extension of an included instance is enabled by a meta-ontology associated with the includer knowledge base which stores the 'extended' slot value and merges this, when necessary, with the actual slot values of the included knowledge base.

This supplementary extension capability averts serious bug falls in the reagent inventory form where one wants to establish new relationships/groupings between conjugations, determinants, specificities, lots, products and vials without concern as to where the items are stored and whether updates to their relationship pointers (instance slot values) can be saved.

(4) polymorphic extension—on an instance level. This antibody X is an extension of antibody Y. Therefore everything that applies to X should also apply to Y. isSameOrPolymorphicExtension(). the thing itself is different and I have to represent the knowledge in a different way. Smart catalogue and stain set inheritance. This B1*a* stain set is related to that B1*b* stain set, and both also detect generic B cells (both perhaps extended from a parent B cell stain)

This aspect of invention appears unique to all forms of data management (instance inheritance as opposed to class inheritance) and has not generally be discussed or foreseen in the ontology community.

In general, this aspect of the invention aspect and of all of KBC in fact is directed to providing software applications whose pace of evolution more closely matches the pace of evolution of life science knowledge because of similarity in evolution pattern. Both life science and ontologies grow predominantly by specialization or extension in independent locations. One scientist will inherit and extend the knowledge of another without altering that prior scientist's knowledge artifact. In the same way a merging ontology will acquire a merged ontology in a read-only without overriding it and then extend/correct it.

6. KBC Elements an Example System (FacsXpert™)

A further understanding of the present invention can be had by considering several examples related to a specific knowledge application and related ontologies referred to as FacsXpert™. The specific knowledge base context for a particular user merges several knowledge bases when opening as indicated by one of the startup splash screen as shown in FIG. 2.

Once all ontologies are loaded they can be inspected in the Help/About FacsXpert™ menu selection. In this FIG. 3, the direction inclusion links can be understood as follows in the example:

1. The specific ontology users(/) sjleblanc@quinelaw.com (/) FACS(/) protocols.pprj a FACS researcher type of ontology includes(/) merges demoMouse.pprj a FACS lab wide type of ontology 2. The specific ontology named org(/) www.ScienceXperts.com(/) FACS(/) demoMouse.pprj includes(/) merges
   a. org(/) www.ScienceXperts.com(/) FACS(/) demoMouse.skg.pprj an SKG organization group wide type of ontology)
   b. org(/) www.ScienceXperts.com(/) FACS(/) facility.pprj a FACS facility wide type of ontology 3. The specific ontology org(/) www.ScienceXperts.com(/) FACS(/) facility.pprj includes(/) merges
   a. org(/) www.ScienceXperts.com(/) FACS(/) skgOrg.pprj an SKG organization wide type of ontology
   b. domains(/) FACS(/) facsWide.pprj a FACS wide type of ontology 4. The specific ontology domains(/) FACS(/) facsWide.pprj includes(/) merges domains(/) Skg.pprj a SKG wide type of ontology The location descriptor refers to the logical location and not the physical. If the computer is offline the location still indicates the server because the local cached copy has not been changed. If when offline and the user saves an ontology, then the local cached copy differs and the location then indicates "local". For example, if one had saved the lab level ontology (demoMouse.pprj) then the Help/About FacsXpert dialog would appear as shown in FIG. 4.

Once online, the local cached copy of the ontology is reconciled with the server using the version number. If the version number at the server indicates another user has updated the server first then the user is warned that their changes will overwrite the other user's.

KBC models an ontology's type in order to regulate inclusion/merging decisions.

In a specific example embodiment, this can be seen by:
1. clicking on the Classes & Instances tab at the bottom of the main window
2. entering FACS researcher specific in the class lookup field at the mid-west side of the window next to the binoculars icon
3. selecting this class in the class tree at the north-west part at the window
4. selecting the instance in the Direct instances list at the north-mid part of the window, as illustrated in FIG. 5.

KBC also provides a super class called Trackable thing for tracking the instance ontology location and instance version details which can be looked up using the class lookup field. This contains attributes (slots) that allows the user to trace/track every instance by version information and ontology source scope.

The user sees this by clicking on a tracking button wherever it appears or by hovering over the button it for a tooltip.

7. Web Site Embodiment

The methods of this invention can be implemented in a localized or distributed computing environment. For example, in one embodiment featuring a localized computing environment, a flow cytometry system is operably linked to a computational device equipped with user input and output features. In a distributed environment, the methods can be implemented on a single computer, a computer with multiple processes or, alternatively, on multiple computers. The computers can be linked, e.g., through a shared bus, but more commonly, the computer(s) are nodes on a network. The network can be generalized or dedicated, at a local level or distributed over a wide geographic area. In certain embodiments, the computers are components of an intra-net or an internet.

In such use, typically, a client (e.g., a scientist, a patient, practitioner, provider, or the like) executes a Web browser and is linked to a server computer executing a Web server. The Web browser is, for example, a program such as IBM's Web Explorer, Internet explorer, NetScape or Mosaic, or the like. The Web server is typically, but not necessarily, a program such as IBM's HTTP Daemon or other WWW daemon (e.g., LINUX-based forms of the program). The client computer is bi-directionally coupled with the server computer over a line or via a wireless system. In turn, the server computer is bi-directionally coupled with a website (server hosting the website) providing access to software implementing the methods of this invention. A user of a client connected to the Intranet or Internet may cause the client to request resources that are part of the web site(s) hosting the application(s) providing an implementation of the methods of this invention. Server program(s) then process the request to return the specified resources (assuming they are currently available). A standard naming convention has been adopted, known as a Uniform Resource Locator ("URL"). This convention encompasses several types of location names, presently including subclasses such as Hypertext Transport Protocol ("http"), File Transport Protocol ("ftp"), gopher, and Wide Area Information Service ("WAIS"). When a resource is downloaded, it may include the URLs of additional resources. Thus, the user of the client can easily learn of the existence of new resources that he or she had not specifically requested.

Methods of implementing Intranet and/or Intranet embodiments of computational and/or data access processes are well known to those of skill in the art and are documented, e.g., in ACM Press, pp. 383-392; ISO-ANSI, Working Draft, "Information Technology-Database Language SQL", Jim Melton, Editor, International Organization for Standardization and American National Standards Institute, July 1992; ISO Working Draft, "Database Language SQL-Part 2: Foundation (SQL/Foundation)", CD9075-2:199.chi.SQL, Sep. 11, 1997; and Cluer et al. (1992) A General Framework for the Optimization of Object-Oriented Queries, Proc SIGMOD International Conference on Management of Data, San Diego, Calif., Jun. 2-5, 1992, SIGMOD Record, vol. 21, Issue 2, June, 1992; Stonebraker, M., Editor. Other resources are available, e.g., from Microsoft, IBM, Sun and other software development companies.

Example Web Interface for Accessing Data Over a Network

FIG. 10 illustrates an example interface for obtaining data analysis using a computer interface, possibly over a web page, according to specific embodiments of the present invention. FIG. 10 illustrates the display of a Web page or other computer interface for requesting statistical analysis. According to specific implementations and/or embodiments of the present invention, this example interface is sent from a server system to a client system when a user accessed the server system. This example Web page contains an input selection 101a, allowing a user to specify input data. As will be understood in the art, each selection button can activate a set of cascading interface screens that allows a user to select from other available options or to browse for an input file. According to specific embodiments of the present invention, option selection 102a can also be provided, allowing a user to modify the user settable options discussed herein. A licensing information section 103 and user identification section 104 can also be included. One skilled in the art would appreciate that these various sections can be omitted or rearranged or adapted in various ways. The 104 section provides a conventional capability to enter account information or payment information or login information. (One skilled in the art would appreciate that a single Web page on the server system may contain all these sections but that various sections can be selectively included or excluded before sending the Web page to the client system.)

FIG. 10 illustrates the display of an interface confirming a request. The confirming Web page can contain various information pertaining to the order and can optionally include a confirmation indication allowing a user to make a final confirmation to proceed with the order. For particular systems or analysis, this page may also include warnings regarding use of proprietary data or methods and can include additional license terms, such as any rights retained by the owner of the server system in either the data.

8. Embodiment in a Programmed Information Appliance

FIG. 11 is a block diagram showing a representative example logic device in which various aspects of the present invention may be embodied. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a viewer on a fixed media for physically loading into a viewer's computer or a fixed media containing logic instructions may reside on a remote server that a viewer accesses through a communication medium in order to download a program component.

FIG. 11 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

9. Integrated Systems

Integrated systems, e.g., for performing FACS assays and data analysis, as well as for the compilation, storage and access of databases, typically include a digital computer with software including an instruction set as described herein, and, optionally, one or more of high-throughput sample control software, image analysis software, other data interpretation software, a robotic control armature for transferring solutions from a source to a destination (such as a detection device) operably linked to the digital computer, an input device (e.g., a computer keyboard) for entering subject data to the digital computer, or to control analysis operations or high throughput sample transfer by the robotic control armature. Optionally, the integrated system further comprises an image scanner for digitizing label signals from labeled assay components.

Readily available computational hardware resources using standard operating systems can be employed and modified according to the teachings provided herein, e.g., a PC (Intel x86 or Pentium chip-compatible DOS™, OS2™, WINDOWS™, WINDOWS NT™, WINDOWS95™, WINDOWS98™, WINDOWS2000™, WINDOWS XP™, LINUX, or even Macintosh, Sun or PCs will suffice) for use in the integrated systems of the invention. Current art in software technology is adequate to allow implementation of the methods taught herein on a computer system. Thus, in specific embodiments, the present invention can comprise a set of logic instructions (either software, or hardware encoded instructions) for performing one or more of the methods as taught herein. For example, software for providing the described data and/or statistical analysis can be constructed by one of skill using a standard programming language such as Visual Basic, Fortran, Basic, Java, or the like. Such software can also be constructed utilizing a variety of statistical programming languages, toolkits, or libraries.

Various programming methods and algorithms, including genetic algorithms and neural networks, can be used to perform aspects of the data collection, correlation, and storage functions, as well as other desirable functions, as described herein. In addition, digital or analog systems such as digital or analog computer systems can control a variety of other functions such as the display and/or control of input and output files. Software for performing the statistical methods of the invention, such as programmed embodiments of the statistical methods described above, are also included in the computer systems of the invention. Alternatively, programming elements for performing such methods as principle component analysis (PCA) or least squares analysis can also be included in the digital system to identify relationships between data. Exemplary software for such methods is provided by Partek, Inc., St. Peter, Mo; on the world wide web at partek.com. Optionally, the integrated systems of the invention include an automated workstation.

Automated and/or semi-automated methods for solid and liquid phase high-throughput sample preparation and evaluation are available, and supported by commercially available devices. For example, robotic devices for preparation of nucleic acids from bacterial colonies, e.g., to facilitate production and characterization of the libraries of candidate genes include, for example, an automated colony picker (e.g., the Q-bot, Genetix, U.K.) capable of identifying, sampling, and inoculating up to 10,000/4 hrs different clones into 96 well microtiter dishes. Alternatively, or in addition, robotic systems for liquid handling are available from a variety of sources, e.g., automated workstations like the automated synthesis apparatus developed by Takeda Chemical Industries, LTD. (Osaka, Japan) and many robotic systems utilizing robotic arms (Zymate II, Zymark Corporation, Hopkinton, Mass.; Orca, Beckman Coulter, Inc. (Fullerton, Calif.)) which mimic the manual operations performed by a scientist. Any of the above devices are suitable for use with the present invention, e.g., for high-throughput analysis of library components or subject leukocyte samples. The nature and implementation of modifications to these devices (if any) so that they can operate as discussed herein will be apparent to persons skilled in the relevant art.

A variety of commercially available peripheral equipment, including, e.g., flow cytometry and related optical and fluorescent detectors, and the like, and software are available for digitizing, storing and analyzing a digitized video or digitized optical or other assay results using a computer. Commerical Suppliers of flow cytometry instrumentation include Beckman Coulter, Inc. (Fullerton, Calif.) among many others.

Example System Embodiment

Figure 12:
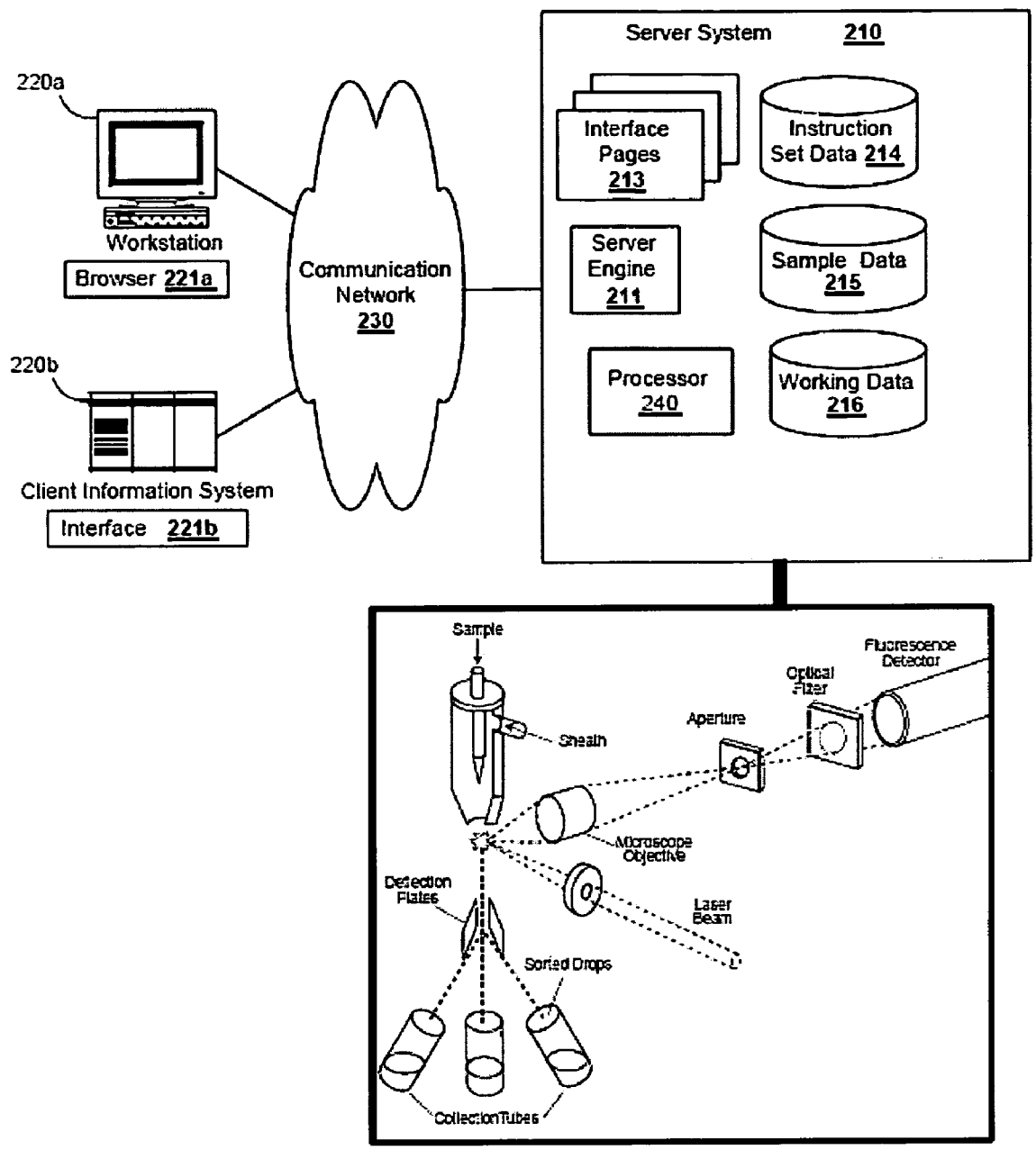
FIG. 12 is a block diagram illustrating an integrated system according to specific embodiments of the present invention.

FIG. 12 is a block diagram illustrating an integrated system according to specific embodiments of the present invention. This particular example embodiment optionally supports providing statistical analysis over a network. The server system 210 includes a server engine 211, various interface pages 213, data storage 214 for storing instructions, data storage 215 for storing sample data, and data storage 216 for storing data generated by the computer system 210. According to specific embodiments of the invention, the server system further includes or is in communication with a processor 240 that further comprises one or more logic modules for performing one or more methods as described herein.

Optionally, one or more client systems may also comprise any combination of hardware and/or software that can interact with the server system. These systems may include digital workstation or computer systems (an example of which is shown as 220a) including a logic interface module (such as 221a) and/or various other systems or products through which data and requests can be communicated to a server system. These systems may also include laboratory-workstation-based systems (an example of which is shown as 220b) including a logic interface module (such as 221b) or various other systems or products through which data and requests can be communicated to a server system.

Optionally, the server computer 210 is in communication with or integrated with a flow cytometer system 290.

10. Other Embodiments

The invention has now been described with reference to specific embodiments. Other embodiments will be apparent to those of skill in the art. In particular, a viewer digital information appliance has generally been illustrated as a personal computer. However, the digital computing device is meant to be any information appliance for interacting with a remote data application, and could include such devices as a digitally enabled television, cell phone, personal digital assistant, etc.

Although the present invention has been described in terms of various specific embodiments, it is not intended that the invention be limited to these embodiments. Modification within the spirit of the invention will be apparent to those skilled in the art. In addition, various different actions can be used to effect the data analysis and/or display described herein. For example, a voice command may be spoken by the purchaser, a key may be depressed by the purchaser, a button on a client-side scientific device may be depressed by the user, or selection using any pointing device may be effected by the user.

It is understood that the examples and embodiments described herein are for illustrative purposes and that various modifications or changes in light thereof will be suggested by the teachings herein to persons skilled in the art and are to be included within the spirit and purview of this application and scope of the claims.

All publications, patents, and patent applications cited herein or filed with this application, including any references filed as part of an Information Disclosure Statement, are incorporated by reference in their entirety.

What is claimed:

1. A computer program product comprising a computer readable medium that is executed by a computer and that comprises one or more logic instructions that:
   at runtime, access information in a meta-ontology, said meta-ontology comprising instances and values allowing said logic instructions to provide a merged ontology from a number of source ontologies;
   using said meta-ontology, determine, at runtime, whether to include one or more ontologies into a merged ontology; and
   using said meta-ontology, control at runtime user access to individual source ontologies while providing users a unified view of a merged ontology, such that a user, while working with said merged ontology, can only access instances in source ontologies for which the user is authorized.

2. The product of claim 1 comprising further logic instructions that:
   using said meta-ontology, make transparent to a user information relating to one or more of:
   data source locations for ontologies,
   how to connect to data source locations for ontologies, and
   how to make data source locations for ontologies available to authorized users when offline;
   determine source ontologies for instances in a knowledge base,
   using said meta-ontology, control ontology versions so as:
   to prevent concurrent modification, and
   to keep offline caches belonging to authorized users in sync with updated versions.

3. The product of claim 1 further comprising one or more logic instructions that:
   make transparent to a user in said merged ontology information relating to one or more of:
   data source locations for source ontologies;
   how to connect to data source locations for source ontologies, and
   how to make data source locations for source ontologies available to authorized users when offline;
   resolve disputes between two or more source ontologies to determine which source ontology will provide particular instances in said merged ontology; and
   control ontology versions so as to prevent concurrent modification and to keep offline caches belonging to authorized users in sync with updated versions.

4. The product of claim 1 further wherein:
   a merging ontology is able to override the merged ontology's attribute-value assertions in a traceable way;
   such that all or part of an instance state in a merged ontology can be overridden in the merging ontology so that whenever the attribute-values are interrogated, the non-overriden or overridden value is naturally rendered without an interrogator needing to know the difference;
   and wherein an additional special interrogation service provides information regarding overridden instance states.

5. The product of claim 1 further comprising a system executing one or more logic instructions comprising:
   a meta-ontology containing information about multiple source ontologies and containing information controlling a run-time environment;
   an ontology management module of logic instructions that access said meta-ontology and control user access to one or more source ontologies;
   wherein said ontology management module further accesses two or more source ontologies and combines them to provide a merged ontology that a user can interact with as a single ontology.

6. The system of claim 5 further wherein combining of ontologies is performed during run-time, said combining not affecting data stored in said source ontologies except as allowed by said meta-ontology.

7. The system of claim 5 further wherein said ontology management module further is able to access two or more source ontologies and combine them to provide a merged ontology that a user can interact with as a single ontology.

8. The system of claim 5 further wherein said meta-ontology comprises two or more distinct classes, from the group consisting of:
   a class that describes an overall type (knowledge scope) of an ontology;
   a class that describes an application version of a knowledge application;
   a class that describes a knowledge application;
   a class that describes shared ontology privileges;
   a class that describes which things are trackable;
   a class that describes ontology scope promotion;
   and further comprising:
   extensions to a knowledge application that access a meta-ontology with a set of class definitions and instances related to ontologies to classify other ontologies into types;
   a class hierarchy defined in said meta-ontology for the purpose of classifying other ontologies; and
   logic providing for run time extensibility for an end-user by enabling a knowledge application to derive a majority of its behavior from runtime interpretation of a meta-ontology, thereby allowing a user to extend a knowledge-base coordinator while its related application is running.

9. The system of claim 5 further wherein one or more of said source ontologies are ontologies developed independently of and unaware of one another.

10. A computer program product comprising a computer readable medium that is executed by a computer and that comprises one or more logic instructions that:
    determine, at runtime, whether to include one or more ontology types in another ontology;
    control, at runtime, user access to individual ontologies;
    hide information relating to: data source locations for ontologies, how to connect to data source locations for ontologies, and how to make data source locations for ontologies available to authorized users when offline;
    determine source ontologies for instances in a knowledge base; and
    control, at runtime, ontology versions so as to prevent concurrent modification and to keep offline caches belonging to authorized users in sync with updated versions.

11. A computer program product comprising a computer readable medium that is executed by a computer and that comprises one or more logic instructions that:
    at runtime, construct a merged ontology from one or more source ontologies, thereby providing combined access to multiple ontologies through a single merged ontology;

at runtime, control a user's access to individual source ontologies, such that a user, while working with said merged ontology, can only access instances in authorized source ontologies;

at runtime, determine whether to include one or more ontology types into said merged ontology;

make transparent to a user in said merged ontology information relating to one or more of:

data source locations for source ontologies;

how to connect to data source locations for source ontologies, and how to make data source locations for source ontologies available to authorized users when offline;

control ontology versions so as to prevent concurrent modification and to keep offline caches belonging to authorized users in sync with updated versions.

12. The product of claim 11 further wherein:

a merging ontology is able to override the resulting ontology's attribute-value assertions in a traceable way;

such that all or part of an instance state in a merged ontology can be overridden by the merging ontology so that whenever the attribute-values are interrogated the non-overriden or overridden value is naturally rendered without an interrogator needing to know the difference.

13. The product of claim 11 further wherein:

an additional special interrogation service is available to provide information regarding overridden instance states.

14. The product of claim 11 further thereby:

providing distinctive support for two common scenarios in knowledge management: (1) disputing knowledge and (2) extending knowledge.

15. The product of claim 14 further wherein:

in the disputing case an override is marked and traced as a challenge to the instance; and resolvable disputes are supported with resolution services that correct the merged instance.

16. The product of claim 15 further wherein:

said logic is able to handle the cases of (1) extending knowledge wherein the override would be marked and traced as an extension to the instance similar to the concept of class extending or sub-classing; (2) providing a supplementary extension wherein the schema of the knowledge is not affected; (3) providing a polymorphic extension on an instance level, thereby allowing for the development of software applications whose pace of evolution more closely matches the pace of evolution of life science knowledge because of similarity in evolution pattern.

17. A method of representing and accessing a knowledge database on a computer system, said method comprising:

at runtime, constructing, by a processor of the computer system, a combined ontology from one or more source ontologies, thereby providing combined access to multiple ontologies through a single merged ontology;

at runtime, controlling, by the processor of the computer system, a user's access to individual source ontologies, such that a user, while working with said merged ontology, can only access instances in authorized source ontologies;

determining, by the processor of the computer system, whether to include one or more ontology types into said merged ontology;

hiding from a user in said merged ontology, by the processor of the computer system, information relating to one or more of:

data source locations for source ontologies;

how to connect to data source locations for source ontologies, and how to make data source locations for source ontologies available to authorized users when offline; and controlling, by the processor of the computer system, ontology versions so as to prevent concurrent modification and to keep offline caches belonging to authorized users in sync with updated versions;

thereby presenting interactively to a user on an output of the computer system data related to biological information to improve the results of a biologic assay.

18. The method of claim 17 further comprising:

providing that a merging ontology is able to override the resulting ontology's attribute-value assertions in a traceable way;

such that all or part of an instance state in a merged ontology can be overridden by the merging ontology so that whenever the attribute-values are interrogated the non-overriden or overridden value is naturally rendered without an interrogator needing to know the difference;

providing an additional special interrogation service to provide information regarding overridden instance states; and providing distinctive support for two common scenarios in knowledge management: (1) disputing knowledge and (2) extending knowledge.

19. The method of claim 17 further wherein:

in the disputing case an override is marked and traced as a challenge to the instance; and resolvable disputes are supported with resolution services that correct the merged instance.

* * * * *